UNITED STATES PATENT OFFICE.

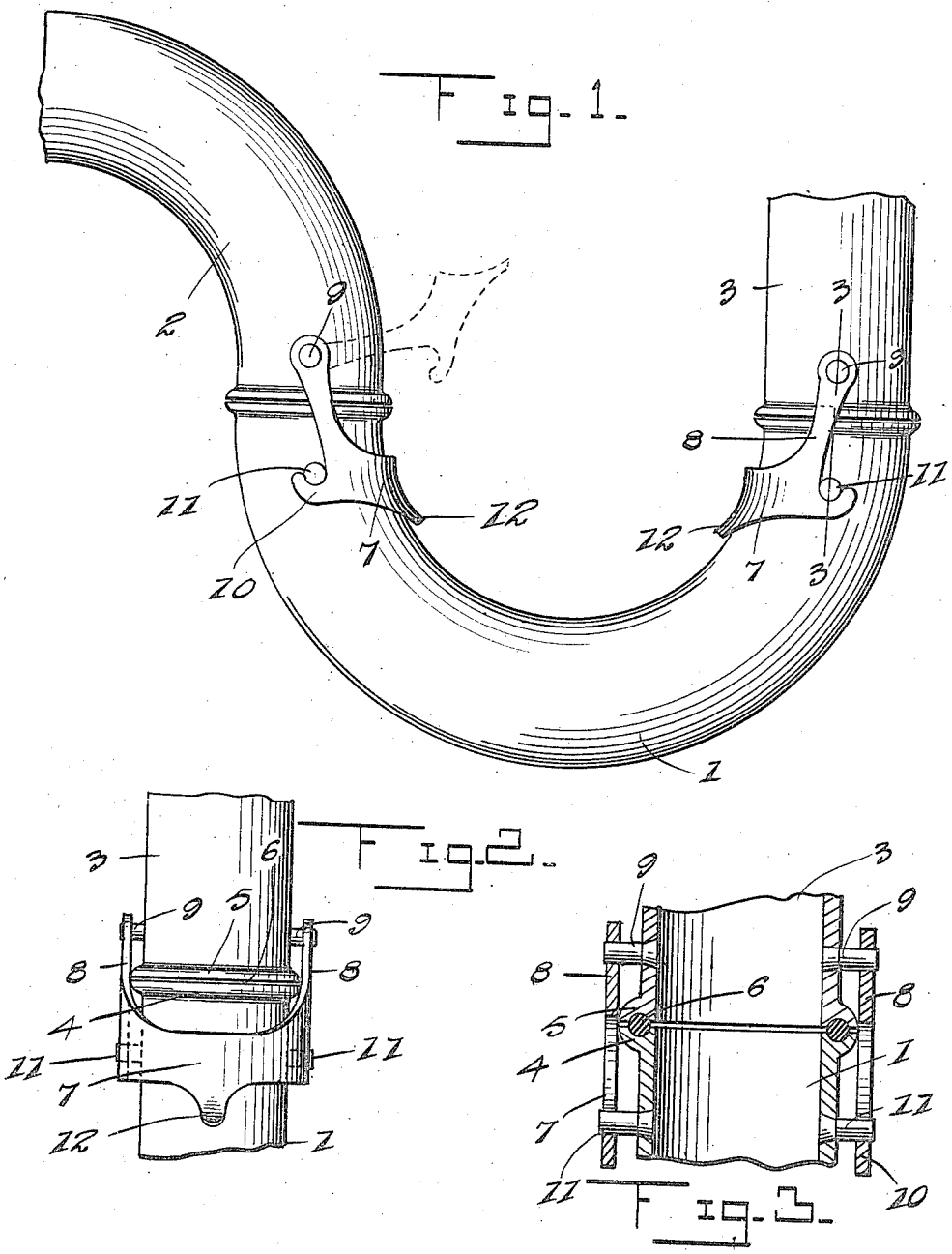

AUGUST A. NAGEL, OF ANTIOCH, CALIFORNIA.

TRAP FOR SINKS, &c.

1,238,802.  Specification of Letters Patent.  Patented Sept. 4, 1917.

Application filed July 13, 1914. Serial No. 850,756.

*To all whom it may concern:*

Be it known that I, AUGUST A. NAGEL, a citizen of the United States, residing at Antioch, in the county of Contra Costa and State of California, have invented certain new and useful Improvements in Traps for Sinks, &c, and I do hereby declare the following to be a full, clear, and exact description of the invention, such as will enable others skilled in the art to which it appertains to make and use the same.

This invention comprehends certain new and useful improvements in traps for sinks and the like and has for its primary object to provide a device of this character which will be of such construction that it may be readily secured in closed position or opened, as desired.

Another object of the invention is to provide a device of this character which will be of such construction that when closed will be securely held in closed position by my improved and novel locking means of extremely simple and cheap construction.

The invention has for a further object to provide a trap and securing means of this character which will be highly efficient in use and which will be of such form as not to require special tools for opening the trap to clean the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of my improved trap and locking means with the trap securely fastened in closed position, and one of the locking members indicated in open position by dotted lines, Fig. 2 is a fragmentary elevation, showing one of the pivoted locking members in operative position, and Fig. 3 is a detail vertical section substantially on the plane of line 3—3 of Fig. 1.

Referring in detail to the drawings by numerals, 1 designates the trap which is composed of a substantially U-shaped pipe with its opposite ends adapted for connection with the opposite ends of the pipe sections 2 and 3, said trap 1 being provided in its upper ends with recessed annular flanges 4 for coöperation with similar annular flanges 5 formed in the ends of the pipe sections 2 and 3 to receive a rubber gasket 6 or the like for the purpose of forming a water tight connection between the ends of the top 1 and the pipe sections 2 and 3, as will be readily understood by referring to the drawings.

In order to securely lock the trap 1 in proper position, I have provided a pair of pivoted locking members 7 which have the upwardly directed arms 8 extending from the curved body portion 7 thereof and pivotally mounted upon the studs 9 projecting outwardly from the opposite sides of the pipe sections 2 and 3 adjacent the lower ends thereof, whereby said pivoted locking members 7 may swing upon the studs 9.

Each pivoted locking member 7 has outwardly curved locking members 10 formed at the opposite ends of the curved body portion of said pivoted locking members and at the lower ends of the arms 8 thereof for engagement beneath the locking studs 11 which project outwardly from opposite sides of the trap 1 adjacent the opposite ends thereof, whereby the opposite ends of the trap 1 will be forced toward the ends of the pipe sections 2 and 3 as the locking members 7 are swung to operative position and the fingers 10 forced beneath the locking studs 11, thereby compressing the gasket 6 to prevent leakage at the opposite ends of the trap 1 and to securely lock said trap 1 in proper position. It will be readily understood that when it is desired to remove the trap 1 to clean the same or for any other purpose, it is simply necessary to engage the finger or a suitable tool beneath the depending tongue 12 formed at the center of the curved body portion of the locking members 7 and swing the latter to inoperative position, thereby disengaging the locking fingers 10 of said members 7 from the locking studs 11, when the opposite ends of said trap 1 may be readily withdrawn from the ends of the pipe sections 2 and 3.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

A trap for sinks comprising a substantially U-shaped pipe and a pair of companion pipes, annular flanges formed on the ends of the pipes and adapted to coöperate with each other in forming annular grooves to receive gaskets to establish water tight connection between the U-shaped pipe and the companion pipes, oppositely disposed lugs formed on the ends of said pipes, a pair of substantially U-shaped locking members having their arm portions pivoted to the lugs upon the companion pipes and having their web portions disposed against the inner curve of the U-shaped pipe, and curved fingers formed on the arm portions of the locking members and adapted to receive the lugs on the U-shaped pipe to cause a tight connection between the pipes.

In testimony whereof I affix my signature in presence of two witnesses.

AUGUST A. NAGEL.

Witnesses:
P. METTIER,
R. B. BLIGH.